(12) United States Patent
Won

(10) Patent No.: US 11,834,830 B2
(45) Date of Patent: Dec. 5, 2023

(54) COUPLER FOR CONNECTING REINFORCING BARS

(71) Applicant: BEST COUPLER CO., LTD., Gimhae-si (KR)

(72) Inventor: Seong Eun Won, Gimhae-si (KR)

(73) Assignees: Jong Min Won, Gimhae-si (KR); Gap Sung Lee, Gimhae-si (KR)

( * ) Notice: Subject to any disclaimer, the term of this patent is extended or adjusted under 35 U.S.C. 154(b) by 850 days.

(21) Appl. No.: 17/043,475

(22) PCT Filed: Oct. 18, 2018

(86) PCT No.: PCT/KR2018/012309
§ 371 (c)(1),
(2) Date: Sep. 29, 2020

(87) PCT Pub. No.: WO2019/078628
PCT Pub. Date: Apr. 25, 2019

(65) Prior Publication Data
US 2021/0355683 A1 Nov. 18, 2021

(30) Foreign Application Priority Data
Oct. 20, 2017 (KR) .......................... 10-2017-0136237

(51) Int. Cl.
*E04C 5/16* (2006.01)
(52) U.S. Cl.
CPC ......... *E04C 5/165* (2013.01); *Y10T 403/5713* (2015.01); *Y10T 403/5786* (2015.01)
(58) Field of Classification Search
CPC .............. E04C 5/165; Y10T 403/5713; Y10T 403/5741; Y10T 403/5761; Y10T 403/5786; F16B 7/0426
See application file for complete search history.

(56) References Cited

FOREIGN PATENT DOCUMENTS

| KR | 20-0374886 Y1 | 2/2005 | | |
|---|---|---|---|---|
| KR | 10-0692913 B1 | 3/2007 | | |
| KR | 10-1602399 B1 | 3/2016 | | |
| KR | 10-1654145 B1 | 9/2016 | | |
| KR | 10-1768816 B1 | 8/2017 | | |
| WO | WO 2011/030973 | * | 3/2011 | ............... E04C 5/16 |
| WO | WO 2014/123298 | * | 8/2014 | ............... E04C 5/16 |

OTHER PUBLICATIONS

KR 20-0374886 Translation: worldwide.espacenet.com. Aug. 23, 2023.*

* cited by examiner

*Primary Examiner* — Michael P Ferguson
(74) *Attorney, Agent, or Firm* — Maschoff Brennan

(57) ABSTRACT

The present invention relates to a coupler for connecting reinforcing bars which is used for connecting reinforcing bars to each other that are used in a construction site and, more specifically, to a coupler for connecting reinforcing bars which has increased strength and excellent fastening force on reinforcing bars through a structural improvement, and also provides increased convenience in assembly, thereby maximizing the manufacturing efficiency. The present invention has increased strength and excellent fastening force on reinforcing bars through a structural improvement to a coupler body, and does not require a separate fixing means by allowing a plurality of piece bodies to be assembled to a piece body guide provided with a magnet, thereby providing increased convenience in assembly and maximizing the manufacturing efficiency.

4 Claims, 6 Drawing Sheets

[FIG.1]
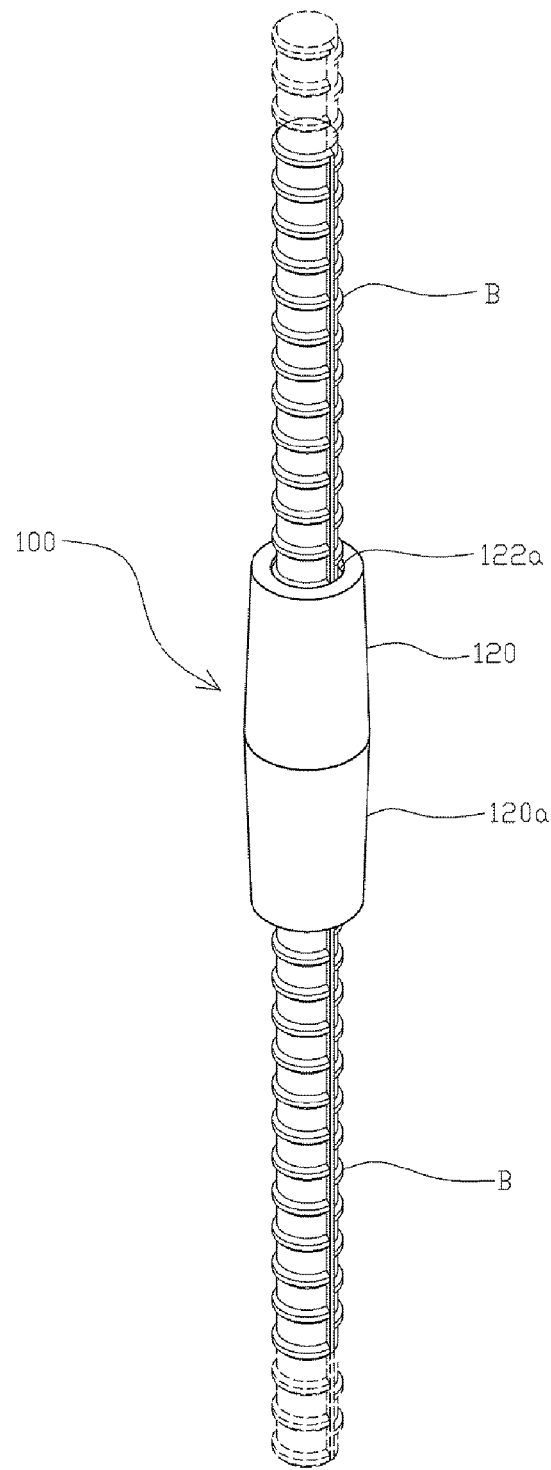

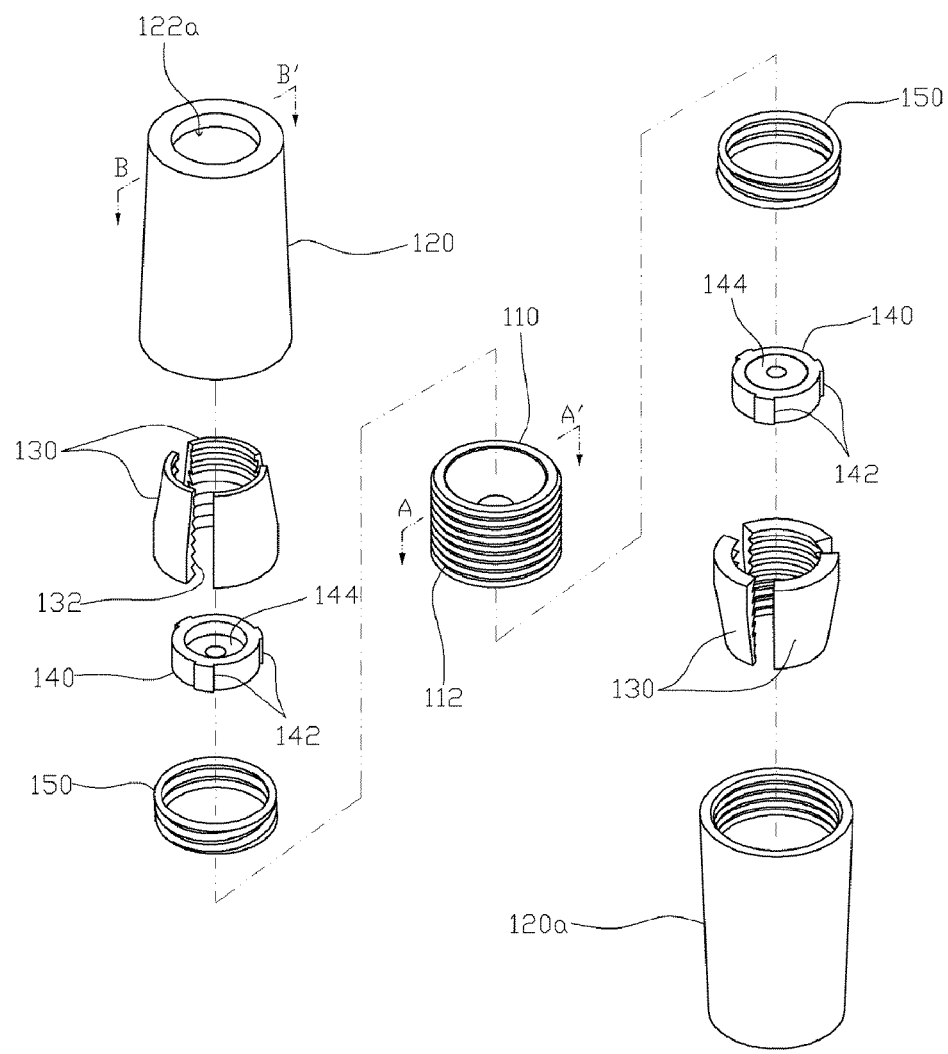
[FIG.2]

[FIG.3]
(a)
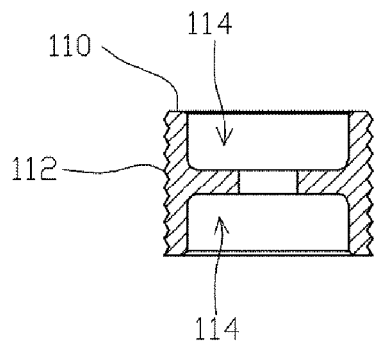
(b)
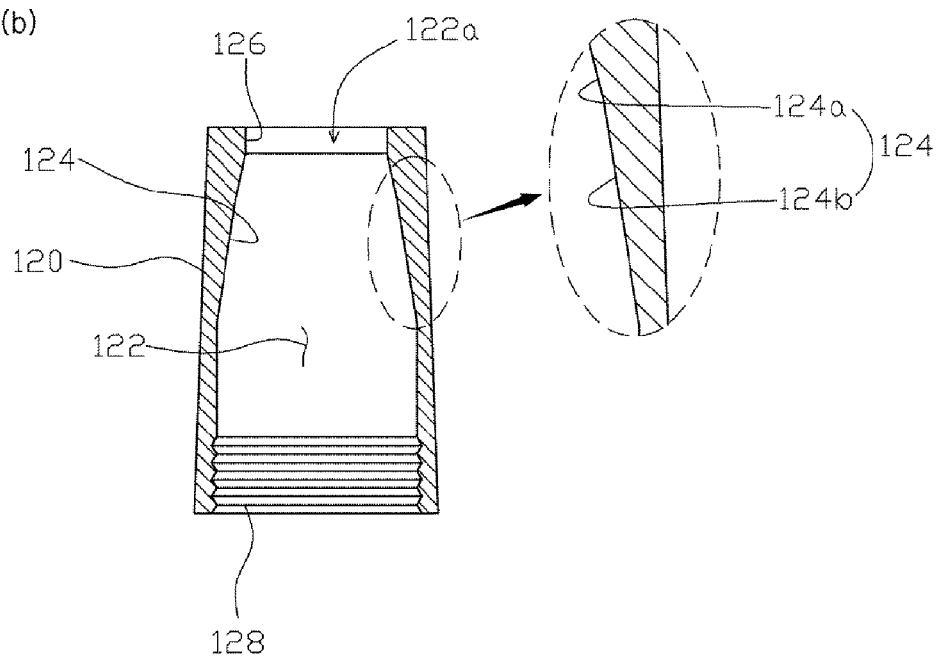
(c)
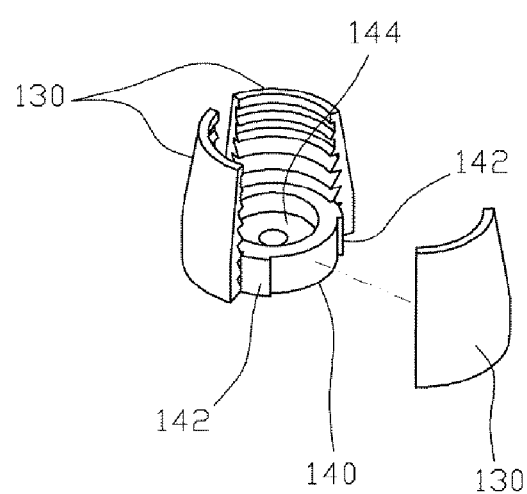

[FIG.4]
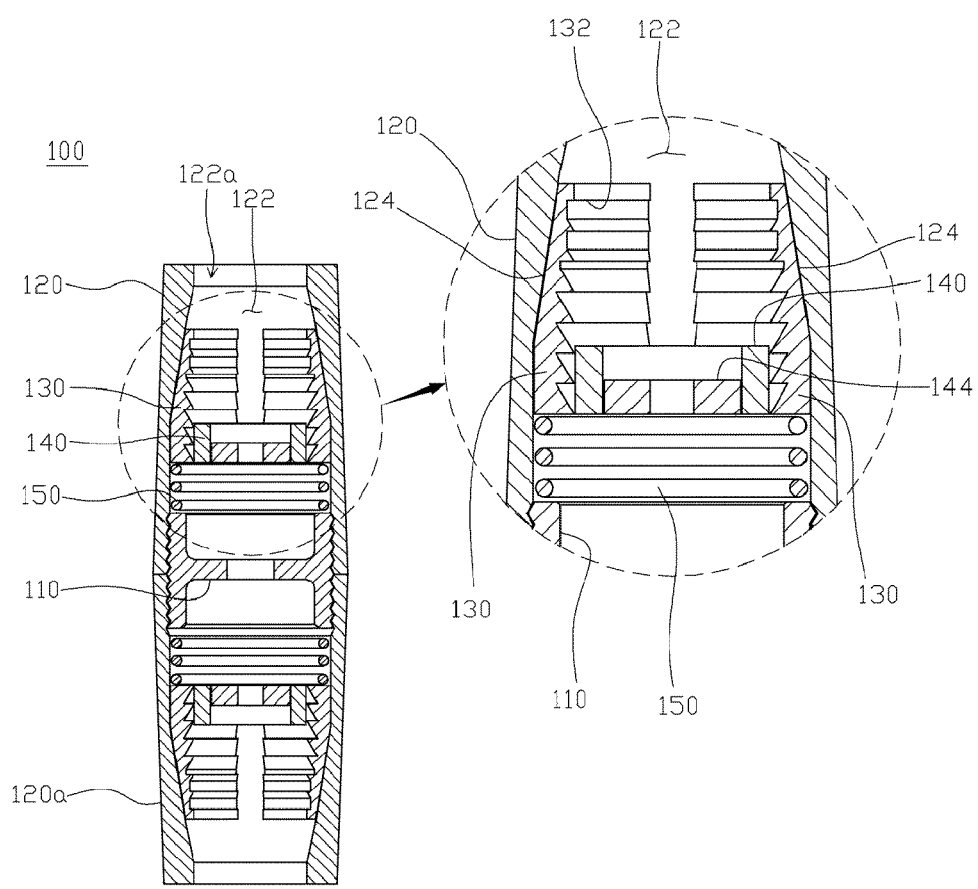

[FIG.5]
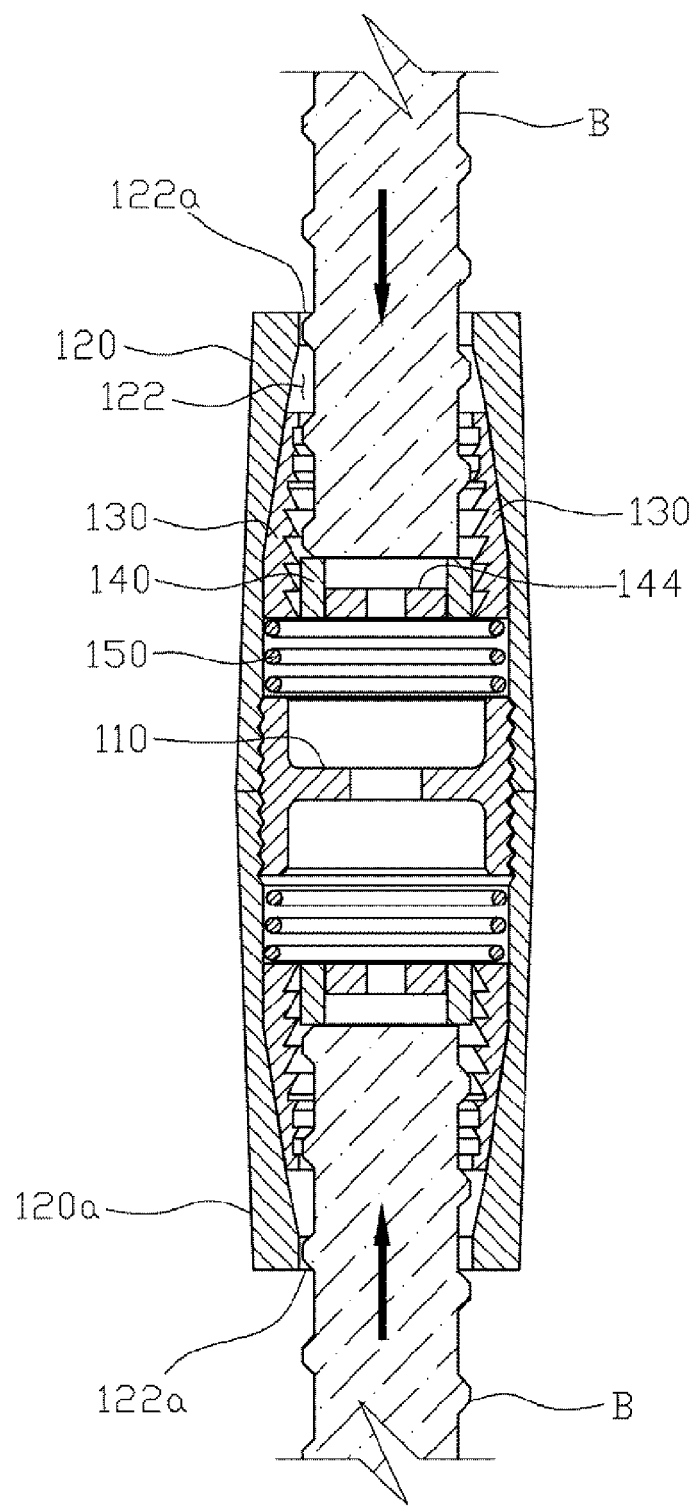

[FIG.6]
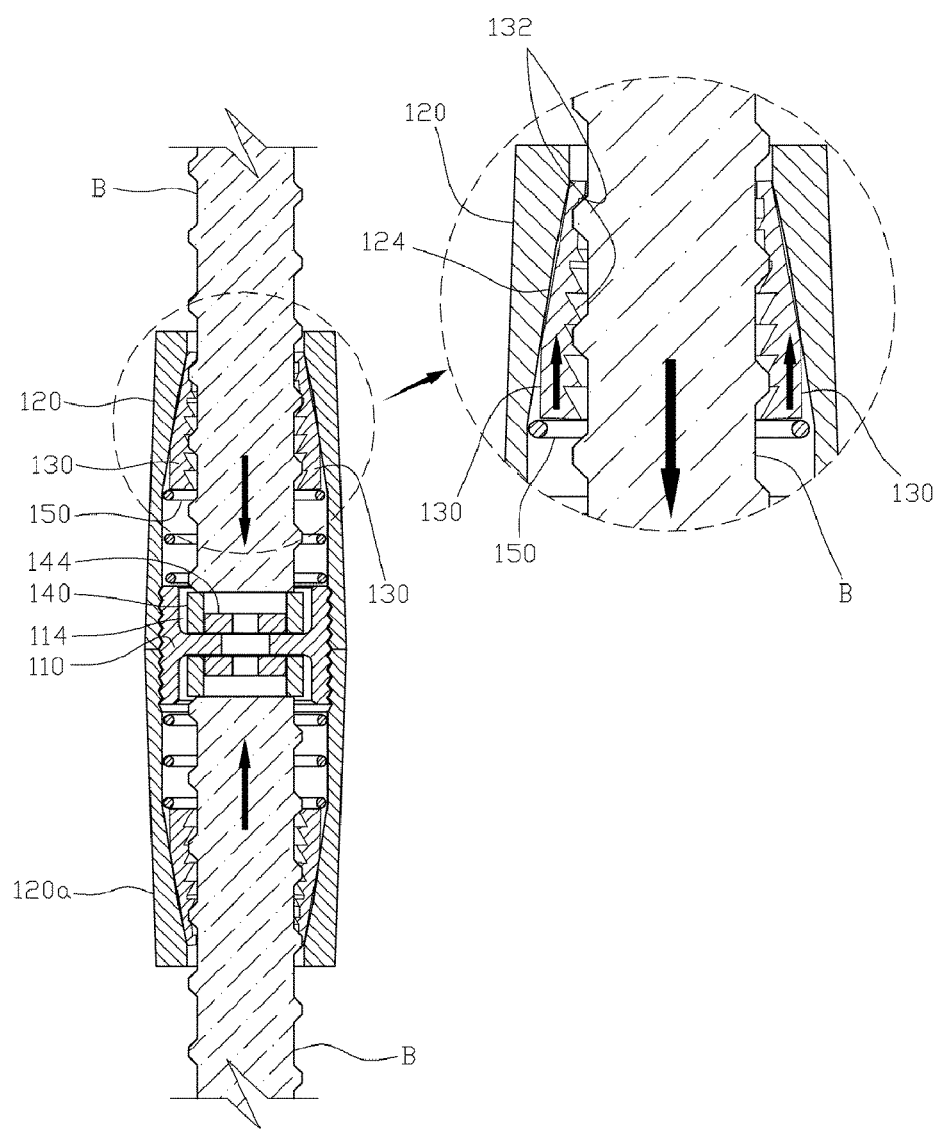

COUPLER FOR CONNECTING REINFORCING BARS

TECHNICAL FIELD

The present disclosure relates to a coupler for reinforcing bar connection used to connect reinforcing bars used on a construction site, and more particularly, a coupler for reinforcing bar connection that provides improved strength and fastening force for reinforcing bars through structural improvement, and maximizes manufacturing efficiency by improving convenience of assembly.

BACKGROUND ART

In general, reinforcing bars are manufactured in standardized lengths for convenience in transportation and the like. On many different construction sites where such reinforcing bars are used, reinforcing bars are connected to each other according to the height or length of the concrete structure. Conventionally, in order to connect the reinforcing bars to each other, the abutting parts of the reinforcing bars are placed overlapping each other and connected by winding wires or the like thereon. However, this operation is an inconvenience for the operator to wind the wire several times, and causes the center of the reinforcing bars to be vertically misaligned and warped or causes the connected parts to be easily broken.

In recent years, a coupler for connecting reinforcing bars has been developed to address the above issues. For example, a one-touch reinforcing bar coupler is disclosed in Korean Patent No. 10-1602399 (announced on Apr. 21, 2010).

Referring to this published document, the coupler includes a fastening part provided inside the coupler body and having a plurality of unit members to fasten a reinforcing bar inserted thereinto, a spacing maintenance member to maintain a shape of the fastening part, an O-ring to fix the shape of the fastening part, and a spring to elastically support a lower side of the fastening part. When a reinforcing bar is inserted and the spacing maintenance member is separated from the fastening part, the fastening part is raised by restoration of the spring to fasten the reinforcing bar. In this configuration, it is necessary to fasten the O-ring in order to keep the fastening part in a radial shape until the reinforcing bar is inserted. However, for this configuration, each O-ring should be fastened to the fastening part in the manufacturing process, and accordingly manufacturing efficiency is poor due to the inconvenience of assembly.

DISCLOSURE

Technical Problem

Therefore, the present disclosure has been made in view of the above problems, and it is one object of the present disclosure to provide a coupler for reinforcing bar connection that provides improved strength and fastening force for reinforcing bars through structural improvement, and maximizes manufacturing efficiency by improving convenience of assembly.

Technical Solution

In accordance with one aspect of the present disclosure, provided is a coupler for connecting reinforcing bar, including a socket with threads formed on an outer circumferential surface thereof; a coupler body screw-coupled to each of upper and lower sides of the socket, the coupler body comprising an inlet formed at one end thereof to allow a reinforcing bar to be inserted thereinto, and a hollow portion provided with an inclined surface having an inner diameter gradually decreasing toward the inlet from a side opposite to the inlet, wherein the inclined surface comprises a first inclined surface formed under the inlet and a second inclined surface extending downward from the first inclined surface, wherein the first inclined surface is formed to have a slope causing the inner diameter to reduce more rapidly than the inner diameter of the second inclined surface to enhance coupling; a plurality of pieces arranged inside the hollow portion of the coupler body with an outer side surface thereof contacting the inclined surface, the plurality of pieces having a locking protrusion formed on an inner side surface thereof to press-contact the inserted reinforcing bar; a piece guide inserted through one end of the plurality of pieces and having a plurality of spacing maintenance portions formed on an outer surface thereof and inserted into a gap between the pieces to widen the gap between the pieces, the piece guide being provided with a magnet to maintain an assembled shape of the pieces seated by the spacing maintenance portions; and an elastic member arranged inside the hollow portion of the coupler body to press the pieces toward the inlet of the coupler body, wherein, when the reinforcing bar inserted through the inlet of the coupler body pushes one end of the piece guide to separate the piece guide from the one end of the plurality of pieces, the pieces are moved toward the inlet along the inclined surface of the coupler body by pressing force of the elastic member and retracted to cause the locking protrusions of the pieces to press-contact an outer surface of the reinforcing bar.

The socket may be provided, on top and bottom surfaces thereof, with a receiving groove to accommodate the piece guide separated from the pieces by the reinforcing bar. The coupler body may be provided with an inclined surface having an inner diameter gradually decreasing toward the inlet, and a vertical surface formed near the inlet to facilitate insertion of the reinforcing bar, wherein a portion of the coupler body near the inlet may be thicker than the other portion of the coupler body to enhance rigidity.

The magnet provided to the piece guide may be integrated with the piece guide or may be separately formed and attached to one end of the piece guide.

Advantageous Effects

According to the present disclosure, enhanced strength and excellent fastening force for the reinforcing bar are obtained through structural improvement of the coupler body. In addition, as a plurality of pieces is assembled to a piece guide having a magnet to eliminate the need for a separate fixing means, the convenience of assembly may be improved, thereby maximizing manufacturing efficiency.

DESCRIPTION OF DRAWINGS

FIG. 1 is a perspective view showing a state of use of a coupler for connecting reinforcing bars according to an exemplary embodiment of the present disclosure.

FIG. 2 is an exploded perspective view showing the coupler for connecting reinforcing bars according to the exemplary embodiment of the present disclosure.

FIG. 3(*a*) is a cross-sectional view showing a socket according to an exemplary embodiment of the present disclosure, taken along line A-A'. FIG. 3(*b*) is a cross-sectional view showing a coupler body, taken along line B-B'. FIG. 3(c) is a perspective view showing a coupling relationship between pieces and a piece guide.

FIG. 4 is a longitudinal sectional view showing the coupling relationship of the coupler for connecting reinforcing bars according to the exemplary embodiment of the present disclosure.

FIG. 5 is a longitudinal sectional view illustrating connecting reinforcing bars to the coupler for connecting reinforcing bars according to the exemplary embodiment of the present disclosure.

FIG. 6 is a longitudinal sectional view showing the reinforcing bars connected to the coupler for connecting reinforcing bars according to the exemplary embodiment of the present disclosure.

REFERENCE NUMERALS

100: Reinforcing bar connecting coupler
110: Socket
112: Thread
114: Receiving groove
120, 120a: Coupler body
122: Hollow portion
122a: Inlet
124: Inclined surface
124a: First inclined surface
124b: Second inclined surface
126: Vertical surface
128: Threaded portion
130: Piece
132: Locking protrusion
140: Piece guide
142: Spacing maintenance portion
144: Magnet
150: Elastic member
B: Reinforcing bar

BEST MODE

Hereinafter, a coupler for connecting reinforcing bars according to the present disclosure will be described in detail with reference to the accompanying drawings.

The terms or words used in the present disclosure and claims described below should not be interpreted as being limited to ordinary or lexical meanings, and should be interpreted as meanings and concepts consistent with the technical spirit of the present invention, based on the principle that the inventor can properly define the terms to best explain the invention.

Accordingly, an exemplary embodiment disclosed in this specification and the configurations shown in the drawings are merely the most preferred embodiment of the present disclosure, and do not represent all the technical spirit of the present disclosure. Therefore, it should be understood that there may be various equivalents and variations that can replace the embodiment and the configurations at the time of filing this application.

FIG. 1 is a perspective view showing a state of use of a coupler for connecting reinforcing bars according to an exemplary embodiment of the present disclosure. Referring to FIG. 1, a reinforcing bar connecting coupler 100 of the present disclosure is used to connect a pair of reinforcing bars B used in civil works or construction sites. When the ends of the reinforcing bars B are inserted into inlets 122a of a pair of coupler bodies 120 and 120a, the coupler connects the two reinforcing bars B to each other. The detailed configuration and operation relationship of the reinforcing bar connecting coupler 100 of the present disclosure will be described below.

FIG. 2 is an exploded perspective view showing the coupler for connecting reinforcing bars according to the exemplary embodiment of the present disclosure. FIG. 3(a) is a cross-sectional view showing a socket according to an exemplary embodiment of the present disclosure, taken along line A-A'. FIG. 3(b) is a cross-sectional view showing a coupler body, taken along line B-B'. FIG. 3(c) is a perspective view showing a coupling relationship between pieces and a piece guide. FIG. 4 is a longitudinal sectional view showing the coupling relationship of the coupler for connecting reinforcing bars according to the exemplary embodiment of the present disclosure.

Referring to FIGS. 2 to 4, the reinforcing bar connecting coupler 100 of the present disclosure includes a socket 110, coupler bodies 120 and 120a symmetrically coupled to upper and lower sides of the socket 110, a plurality of pieces 130 arranged inside the coupler bodies 120 and 120a, respectively, a piece guide 140 provided to maintain spacing between the plurality of pieces 130 and maintain an assembled shape, and an elastic member 150 arranged inside the coupler bodies 120 and 120a to press the pieces 130.

First, the socket 110 is formed of a hard metal material and has a cylindrical shape as a whole. As shown in FIGS. 2 and 3(a), threads 112 are formed on the outer circumferential surface of the socket, and receiving grooves 114 are formed on the top and bottom surfaces thereof.

Next, the coupler body 120 is formed of a hard metal material, and includes an inlet 122a formed at one end thereof to allow a reinforcing bar to be inserted thereinto, and a hollow portion 122 provided with an inclined surface 124 having an inner diameter gradually decreasing from a side opposite to the inlet 122a toward the inlet, as shown in FIGS. 2 and 3. The inner diameter of the coupler body 120 on the side opposite to the inlet 122a is provided with a threaded portion 128 formed to be screw-coupled to the threads 112, which are formed on the outer circumferential surface of the socket 110. The inner diameter of the coupler body 120 has a shape that gradually decreases toward the inlet from the side opposite to the inlet, but is preferably formed to have a vertical surface 126 on the side of the inlet 122a. This is intended to facilitate insertion of a reinforcing bar and improve rigidity by making the portion near the inlet thicker than the other portion. In addition, the inclined surface 124 of the coupler body 120 is formed by two parts: a first inclined surface 124a formed under the vertical surface 126 on the side of the inlet 122a and a second inclined surface 124b extending downward from the first inclined surface 124a. The second inclined surface 124b may have a slope by which the inner diameter thereof gradually decreases as the surface extends toward the inlet, and the first inclined surface 124a may have a slope by which the inner diameter thereof sharply decreases compared to that of the second inclined surface 124b.

The coupler body 120 consists of a pair of the coupler body 120 on an upper side and a coupler body 120a on a lower side, which are symmetrically coupled to the threads 112 on the upper and lower sides of the socket 110, as shown in FIG. 4. When a reinforcing bar is inserted into the inlet of each of the coupler bodies 120 and 120a, the two reinforcing bars are connected to each other. The plurality of pieces 130, the piece guide 140, and the elastic member 150 arranged inside the coupler body 120 are symmetrically arranged in the coupler bodies 120 and 120a disposed on the upper and lower sides, respectively. As for these components, the same reference numerals are used to denote the same configurations and operations. To provide understanding, the reinforcing bar connecting coupler 100 of the present disclosure will be described mainly focusing on the coupler body 120, the plurality of pieces 130, the piece guide 140 and the elastic member 150 which are disposed on the upper side.

Next, the plurality of pieces 130 is installed in the hollow portion 122 of the coupler body 120, and the outer surface thereof has a slope corresponding to the inclined surface 124 of the coupler body 120 and thus contacts the inclined surface. The pieces 130 (three pieces in this embodiment) all have the same shape, and a plurality of locking protrusions 132 is formed on the inner surface thereof to support a reinforcing bar by being caught on the outer surface of the reinforcing bar, preferably nodes formed on the reinforcing bar. The locking protrusions 132 are arranged at a constant pitch in the axial direction of the coupler body 120, and may have a ratchet tooth shape so as to resist the tensile force applied from the nodes of the reinforcing bar and prevent the reinforcing bar from being displaced.

Next, the piece guide 140 is formed of a hard metal material and has a cylindrical shape as a whole. The piece guide includes a plurality of spacing maintenance portions formed on an outer surface thereof in a circumferential direction. The piece guide 140 further incudes a magnet 144 to generate magnetic force. In this case, as a method to provide the magnet 144 to the piece guide 140, the piece guide 140 may be formed of a magnetic material or a separate magnet 144 may be attached to one side of the piece guide 140. When the piece guide 140 is inserted into the lower end of the plurality of pieces 130 as shown in FIGS. 3(*c*) and 4, the lower end of the inner side surface of each piece 130 is positioned between the spacing maintenance portions 142 formed on the piece guide 140. Thereby, the pieces are stably maintained in an open position. As the piece guide 140 is provided with the magnet 144, the plurality of pieces 130 is attached thereto by magnetic force. Accordingly, the pieces remain attached to the piece guide 140, i.e., in an assembled position in a conical shape, without using a separate fixing means as in the conventional cases. Here, according to the present disclosure, as a separate fixing means is not required to maintain the plurality of pieces 130 in a conical shape, the convenience of assembly may be greatly improved, and the efficiency of the overall manufacturing process may be maximized.

As described above, the piece guide 140 to which the plurality of pieces 130 is attached maintains the pieces 130 in the open position inside the hollow part 122 of the coupler body 120, overcoming the elastic force of the elastic member 150, which will be described later. Then, the piece guide is separated from the pieces 130 by a reinforcing bar inserted through the inlet 122*a* of the coupler body 120.

Finally, the elastic member 150 is formed in the form of a coil spring in this embodiment, but is not limited to this shape. The elastic member may take any form capable of providing elastic force. As shown in FIG. 4, the elastic member 150 is installed inside the hollow portion 122 of the coupler body 120 to press the pieces 130 toward the inlet 122 of the coupler body 120. That is, it is arranged between the socket 110 and the pieces 130 to press the pieces 130 toward the inlet of the coupler body 120. Here, the elastic member 150 supports the pieces 130 so as not to interfere with the piece guide 140, which assembles the pieces, such that when the piece guide 140 is separated from the pieces 130, the elastic member 150 do not interfere therewith.

Although the elastic member 150 presses the pieces 130 toward the inlet 122*a* of the coupler body 120, the pieces 130 are arranged on the piece guide 140 in an assembled state, and are thus maintained by the weight thereof overcoming the elastic force of the elastic member 150.

The reinforcing bar connecting coupler 100 of the present disclosure configured as described above operates as follows.

FIG. 5 is a longitudinal sectional view illustrating connecting reinforcing bars to the coupler for connecting reinforcing bars according to the exemplary embodiment of the present disclosure, and FIG. 6 is a longitudinal sectional view showing the reinforcing bars connected to the coupler for connecting reinforcing bars according to the exemplary embodiment of the present disclosure.

First, referring to FIG. 5, when two reinforcing bars B are inserted into the hollow portion 122 through the inlets 122*a* of the coupler bodies 120 and 120*a*, which are disposed on the upper and lower sides of the socket 110, to connect the two reinforcing bars, the reinforcing bars come into contact with the piece guide 140, by which the pieces 130 are assembled, through a space between the pieces 130.

When the reinforcing bars B are further inserted in this state as shown in FIG. 6, the piece guide 140 that assembles the plurality of pieces 130 is separated from the pieces 130 and accommodated in the receiving groove 114 formed in the socket 110. When the piece guide 140 is separated, the pieces 130 may be moved toward the inlets 122 of the coupler bodies 120 and 120*a* by the elastic force (restoring force) of the elastic member 150, which elastically supports the plurality of pieces 130. At this time, the pieces 130 are moved closer to each other by the shape of the inner diameter of the coupler bodies 120 and 120*a*, that is, the inclined surface 124, which is gradually narrowed toward the inlet 122*a*, and the locking protrusions 132 formed on the inner surfaces of the pieces 130 press-contact the outer surface of the inserted reinforcing bars B, namely, the nodes, preventing the reinforcing bars from being separated in the reverse direction. Thereby, the two reinforcing bars B are connected to each other.

In particular, since the portions near the inlet 122*a* of the coupler body 120 are formed to be thicker than the other portions, the connection between the reinforcing bars B may be strong. When the inclined surface 124 forming the inner diameter of the coupler body is composed of first and second inclined surfaces 124*a* and 124*b*, the pieces 130 move along the second inclined surface 124*b* having a gentle slope to press-contact the reinforcing bars B. Then, when the pieces reach the first inclined surface 124*a*, they are rapidly retracted to press-contact the reinforcing bars, thereby enhancing coupling.

The foregoing description has outlined somewhat broadly the features and technical advantages of the present disclosure to provide better understanding of the claims of the present disclosure set forth below. Additional features and advantages constituting the claims of the present disclosure will be disclosed in detail below. It should be recognized by those skilled in the art that the disclosed concepts and specific embodiments of the present disclosure can be used immediately as a basis for design of other structures or modifications for carrying out similar purposes to the present invention.

In addition, the concepts and embodiments disclosed in the present disclosure form the basis of design of other structures or modifications for carrying out the same purpose of the present disclosure. For such equivalent structures formed by making modifications or changes by those skilled in the art, various changes, substitutions, and changes may be made without departing from the spirit or scope of the invention disclosed in the claims.

INDUSTRIAL APPLICABILITY

In the present disclosure, the coupler for reinforcing bar joints is used to connect reinforcing bars used in construction sites to each other, and can be used industrially.

The invention claimed is:

1. A coupler for connecting reinforcing bar, comprising:
a socket with threads formed on an outer circumferential surface thereof;
a coupler body screw-coupled to each of upper and lower sides of the socket, each coupler body comprising an inlet formed at one end thereof to allow a reinforcing bar to be inserted thereinto, and a hollow portion provided with an inclined surface having an inner diameter gradually decreasing toward the inlet from a side opposite to the inlet, wherein the inclined surface comprises a first inclined surface formed under the inlet and a second inclined surface extending downward from the first inclined surface, wherein the first inclined surface is formed to have a slope causing the inner diameter to reduce more rapidly than the inner diameter of the second inclined surface to enhance coupling;
a plurality of pieces circumferentially arranged inside the hollow portion of each coupler body with an outer side surface thereof contacting the inclined surface, the plurality of pieces having a locking protrusion formed on an inner side surface thereof to press-contact the inserted reinforcing bar;
a piece guide inserted through one end of the plurality of pieces within each coupler body and having a plurality of spacing maintenance portions formed on an outer surface thereof and inserted into a gap between the pieces to widen the gap between the pieces, the piece guide being provided with a magnet to maintain an assembled shape of the pieces seated by the spacing maintenance portions; and
an elastic member arranged inside the hollow portion of each coupler body to press the pieces toward the inlet of the coupler body,
wherein, when the reinforcing bar inserted through the inlet of each coupler body pushes one end of the piece guide to separate the piece guide from the one end of the plurality of pieces, the pieces are moved toward the inlet along the inclined surface of the coupler body by a pressing force of the elastic member and retracted to cause the locking protrusions of the pieces to press-contact an outer surface of the reinforcing bar.

2. The coupler of claim 1, wherein the socket is provided, on top and bottom surfaces thereof, with a receiving groove to accommodate the piece guide separated from the pieces by the reinforcing bar.

3. The coupler according to claim 1, wherein each coupler body is provided with an inclined surface having an inner diameter gradually decreasing toward the inlet, and a vertical surface formed near the inlet to facilitate insertion of the reinforcing bar,
wherein a portion of the coupler body near the inlet is thicker than the other portion of the coupler body to enhance rigidity.

4. The coupler of claim 1, wherein the magnet provided to each piece guide is integrated with the piece guide or is separately formed and attached to one end of the piece guide.

* * * * *

UNITED STATES PATENT AND TRADEMARK OFFICE
CERTIFICATE OF CORRECTION

| | |
|---|---|
| PATENT NO. | : 11,834,830 B2 |
| APPLICATION NO. | : 17/043475 |
| DATED | : December 5, 2023 |
| INVENTOR(S) | : Seong Eun Won |

It is certified that error appears in the above-identified patent and that said Letters Patent is hereby corrected as shown below:

On the Title Page

In Item (71), delete "BEST COUPLER CO., LTD., Gimhae-si (KR)" and insert -- Jong Min Won, Gimhae-si (KR) --, therefor.

Signed and Sealed this
First Day of October, 2024

Katherine Kelly Vidal
*Director of the United States Patent and Trademark Office*